US006462769B1

(12) United States Patent
Trowbridge et al.

(10) Patent No.: US 6,462,769 B1
(45) Date of Patent: Oct. 8, 2002

(54) IMAGE CORRECTION METHOD TO COMPENSATE FOR POINT OF VIEW IMAGE DISTORTION

(75) Inventors: Scott Trowbridge; Thierry J. Coup, both of Orlando, FL (US)

(73) Assignee: Universal City Studios, Inc., Universal City, CA (US)

( * ) Notice: Subject to any disclaimer, the term of this patent is extended or adjusted under 35 U.S.C. 154(b) by 7 days.

(21) Appl. No.: 09/688,971

(22) Filed: Oct. 16, 2000

Related U.S. Application Data

(63) Continuation of application No. 09/206,668, filed on Dec. 7, 1998, now abandoned.

(51) Int. Cl.[7] .................................................. H04N 7/18

(52) U.S. Cl. .......................... 348/51; 348/746; 348/747; 472/60; 472/61

(58) Field of Search ............................. 348/51, 39, 121, 348/147, 746, 747; 472/60, 61; H04N 7/18

(56) References Cited

U.S. PATENT DOCUMENTS

| 1,124,665 | A | 1/1915 | Schneider |
| 1,972,019 | A | 8/1934 | Kanolt |
| 2,131,778 | A | 10/1938 | Wilmot |
| 2,252,467 | A | 8/1941 | Luzzati |
| 2,857,805 | A | 10/1958 | O'Brien |
| 2,999,322 | A | 9/1961 | Hemstreet |
| 3,012,337 | A | 12/1961 | Spencer et al. |

(List continued on next page.)

FOREIGN PATENT DOCUMENTS

| DE | 40 15 048 A1 | 11/1990 |
| EP | 0 198 630 B1 | 10/1986 |
| EP | 0 306 448 A3 | 3/1989 |
| EP | 0 421 856 A1 | 4/1991 |
| EP | 0 577 380 A1 | 1/1994 |

OTHER PUBLICATIONS

"Slide Preparation: Distortion and Other Problems", Projection: Principles and Practice, pp. 78–81.

Richter, Jean Paul, "The Notebooks of Leonardo Da Vinci", The Theory of the Art of Painting, 1970, pp. 25–65, vol. 1, Dover Publications, Inc., New York.

Bernstein, Ralph, "Digital Image Processing, The IBM Image Processing Facility is Described and the Mosaicking of LANDSAT Imagery and Multispectral Classification of Mineral Deposits are Discussed", Digital Image Processing for Remote Sensing, 1978, pp. 73–83, The Institute of Electrical and Electronics Engineers, Inc., New York.

(List continued on next page.)

*Primary Examiner*—Howard Britton
(74) *Attorney, Agent, or Firm*—Lyon & Lyon LLP

(57) ABSTRACT

An image correction method of compensating for point of view image distortion in pictures includes the steps of obtaining an image at a first position within a predetermined frame, wherein at the first position the image is distorted due to point of view image distortion. The image obtained comprises an array of pixels. The distorted image is transformed into a compensated image by re-mapping the array of pixels of the distorted image using a predetermined transforming function that stretches the distorted image to fill the entire frame. The transformation function depends on the geometric orientation of the camera, projector, projecting surface, and viewer. The compensated image is projected at a second position different from the first position, wherein the projection of the compensated image substantially reduces point of view image distortion at the first position. This method can be employed for stationary and moving point of views. The method is particularly helpful with amusement rides for viewing 3D stereoscopic images.

23 Claims, 7 Drawing Sheets

U.S. PATENT DOCUMENTS

| | | |
|---|---|---|
| 3,101,645 A | 8/1963 | Hemstreet |
| 3,261,912 A | 7/1966 | Hemstreet |
| 3,564,133 A | 2/1971 | Hobrough |
| 3,630,604 A | 12/1971 | Miller |
| 3,892,051 A | 7/1975 | Bunker |
| 3,915,569 A | 10/1975 | Polzleitner |
| 4,078,860 A | 3/1978 | Globus et al. |
| 4,089,597 A | 5/1978 | Collender |
| 4,154,514 A | 5/1979 | Harvey |
| 4,315,241 A | 2/1982 | Spooner |
| 4,340,878 A | 7/1982 | Spooner et al. |
| 4,347,507 A | 8/1982 | Spooner |
| 4,347,508 A | 8/1982 | Spooner |
| 4,373,794 A | 2/1983 | Holman |
| 4,383,740 A | 5/1983 | Bordovsky |
| 4,463,380 A | 7/1984 | Hooks, Jr. |
| 4,484,347 A | 11/1984 | Kashioka |
| 4,485,409 A | 11/1984 | Schumacher |
| 4,496,972 A | 1/1985 | Lippmann et al. |
| 4,551,752 A | 11/1985 | Wall et al. |
| 4,597,741 A | 7/1986 | Stickel |
| 4,630,111 A | 12/1986 | Blain et al. |
| 4,645,459 A | 2/1987 | Graf et al. |
| 4,656,521 A | 4/1987 | Trzeciak et al. |
| 4,714,428 A | 12/1987 | Bunker et al. |
| 4,734,690 A | 3/1988 | Waller |
| 4,750,808 A | 6/1988 | Nash et al. |
| 4,772,942 A | 9/1988 | Tuck |
| 4,814,607 A | 3/1989 | Hofmann |
| 4,845,643 A | 7/1989 | Clapp |
| 4,862,388 A | 8/1989 | Bunker |
| 4,924,094 A | 5/1990 | Moore |
| 4,951,040 A | 8/1990 | McNeil et al. |
| 4,978,216 A | 12/1990 | Liljegren et al. |
| 4,985,854 A | 1/1991 | Wittenburg |
| 5,023,725 A | 6/1991 | McCutchen |
| 5,036,251 A | 7/1991 | Lee |
| 5,051,835 A | 9/1991 | Bruehl et al. |
| 5,065,236 A | 11/1991 | Diner |
| 5,067,019 A | 11/1991 | Juday et al. |
| 5,091,773 A | 2/1992 | Fouche et al. |
| 5,101,475 A | 3/1992 | Kaufman et al. |
| 5,161,013 A | 11/1992 | Rylander et al. |
| 5,170,439 A | 12/1992 | Zeng et al. |
| 5,175,808 A | 12/1992 | Sayre |
| 5,179,440 A | 1/1993 | Loban et al. |
| 5,185,667 A | 2/1993 | Zimmermann |
| 5,204,944 A | 4/1993 | Wolberg et al. |
| 5,208,766 A | 5/1993 | Chang et al. |
| 5,319,749 A | 6/1994 | Haaker et al. |
| 5,327,502 A | 7/1994 | Katata et al. |
| 5,329,310 A * | 7/1994 | Liljegren et al. ........... 348/147 |
| 5,481,479 A | 1/1996 | Wight et al. |
| 5,552,839 A * | 9/1996 | Kuhl .......................... 348/744 |
| 5,566,370 A * | 10/1996 | Young .......................... 348/36 |
| 5,644,324 A | 7/1997 | Maguire, Jr. |
| 6,084,557 A | 7/2000 | Ishida et al. |

OTHER PUBLICATIONS

Anderson, David P., "An Orientation Method for Central Projection Programs", Dec. 16, 1980, pp. 35–37, Chemistry Department, University of Wisconsin, Madison, WT.

Huang, T.S. et al., "3D Motion Estimation", Machine Vision for Three-Dimensional Scenes, 1990, pp. 195–219, Academic Press, Inc.

Grosky, William I. et al., "A Unified Approach to the Linear Camera Calibration Problem", IEEE Transactions on Pattern Analysis and Machine Intelligence, Jul. 1990, pp. 663–671, vol. 12, No. 7, IEEE.

Weinhaus, F. et al., "A Flexible Approach to Image Warping", Image Processing Algorithms and Techniques, 1990, pp. 108–122, vol. 1244, SPIE.

Trainer, Thomas J. et al., "Image Resampling in Remote Sensing and Image Visualization Applications", Applications of Digital Image Processing XIV, Mar. 1991, pp. 650–658, vol. 1567, SPIE.

Dorsey, Julie O'B. et al., "Design and Simulation of Opera Lighting and Projection Effects", Computer Graphics, Jul. 1991, pp. 41–50, vol. 25, Cornell University, Ithaca, New York.

Diner, Daniel B., Ph.D., "A New Definition of Orthostereopsis for 3-D Television", Man–Machine Systems Robotics and Automation Systems Section, Aug. 1991, pp. 1053–1058, California Institute of Technology, Pasadena, California.

Stroebel, Leslie, View Camera Technique 6th Edition, 1993, pp. 116–118, Focal Press, Boston, London.

Spatial Transformations, pp. 62–94.

* cited by examiner

IMAGE CORRECTION METHOD TO COMPENSATE FOR POINT OF VIEW IMAGE DISTORTION

This application is a continuation of application Ser. No. 09/206,668, filed on Dec. 7, 1998, and now abandoned.

BACKGROUND OF THE INVENTION

The field of the invention is imaging techniques for use with projected moving images for the reduction or elimination of geometric distortion. The technique is particularly useful in motion pictures, amusement rides, and the like.

Since the inception of motion pictures, the ability to present realistic sequences of moving images has been particularly desirable. The methods and techniques of projecting a series of images onto a screen are now well understood whether from photographic film, video output, or output from a computer. While the projection techniques used in modern motion pictures are capable of producing realistic visual effects, there remains numerous factors that limit the perceived realism or fidelity of the images. Some of the more important limitations include brightness, color, accuracy, sharpness, strobing, aliasing, artifacts, and grain. One particularly troublesome limitation on the realism and fidelity of moving projected images is geometric distortion.

Geometric distortion of the projected image can result from any one of many factors. For example, some of the more important factors of geometric distortion are: (1) the refractive properties of the original lens through which the images were captured or created, (2) the refractive properties of the projector lens, (3) the location and orientation of the projection screen relative to the projector, and (4) the location of the viewer relative to the projection surface.

The first three factors mentioned above have generally been carefully fine-tuned since the inception of motion pictures so as to produce the most convincing illusion of reality for the viewer. For example, camera lenses and projector lenses are carefully designed and selected so as to produce the least distortion possible. Moreover, the orientation of the projection screen and the projector are positioned so as to optimize the illusion of reality of the image.

The last factor, namely the orientation of the viewer relative to the projection screen has been particularly problematic. For example, in a typical motion picture theater, point of view distortion can be readily observed. If a viewer sits near the center of the theater, the moving images appear "correct" in that the moving images appear as they would in real life. However, as the viewer moves nearer the projection screen, or moves to the right or left of center, the apparent shape of the projection screen changes. This shape of the projection screen appears to be foreshortened, i.e., the shape changes to appear as a rhombus. (See FIG. 3). As a result of the foreshortening, the images look distorted to the viewer, and the perceived quality of the images suffers.

Image distortion is particularly noticeable when viewing 3D or stereoscopic motion pictures. Stereoscopic motion pictures have always been produced for a stationary audience, typically using "3D" eyeglasses or visors. The viewpoint of the viewer or audience does not move relative to the image projection surface or screen. However, if the viewer moves relative to the projection surface, the perspective shift unnaturally and appear to "follow" the viewer around the room. Up until now this "following" effect has not created any drawbacks in 3D theatres, as the audience in such theatres has always been seated in a fixed position relative to the screen. However, in contrast to known 3D theatres, the invention combines 3D images with movement of the audience, to produce a thrilling and novel combination of visual and sensory effects. As a result, the "following" effect must be accounted for.

As an example of the "following effect", if a stereoscopic image on the screen was recorded by a camera located at an intersection looking down a corridor of tall buildings, and if the viewer started walking around in the theater, the entire scene would seem to revolve and rotate as seen from the viewer's perspective. No matter where the viewer walks in relation to the projected image, the image will move, rotate, contract, and stretch, so that the viewer perceives he or she is standing still in the same location. This characteristic provides an environment to the viewer that is completely unrealistic, and greatly diminishes the realistic impression given to viewers that are in motion relative to the screen or projection surface.

Consequently, with the combination of 3D images and movement of the audience provided by the invention, there is a need for a method of compensating for the point of view distortion that takes place when a viewer moves relative to a projected stereoscopic 3D image, and to eliminate the following effect occurring in traditional stereoscopic 3D projections. There is also a need for the projected images to look as realistic as possible, giving the viewer the impression that he or she is looking through a "window" into a virtual world.

SUMMARY OF THE INVENTION

The present invention is directed to an image correction method to compensate for point of view image distortion.

In a first separate aspect of the present invention a method for compensating for motionless point of view image distortion is provided. The method includes the steps of obtaining an image within a predetermined frame at a first position, the image comprising an array of image points, wherein at the first position, the image is distorted due to point of view image distortion. The distorted image is then transformed into a compensated image, the transformation comprising the step of re-mapping the array of image points of the distorted image using a transformation function. The transformation operates on the array of image points to stretch the distorted image to fill the entire frame. The compensated image is projected at a second position different from the first position, such that the projection of the compensated image substantially reduces point of view image distortion at the first position.

In a second separate aspect of the present invention, a method is provided for compensating for point of view image distortion for a moving point of view. The method includes the steps of first determining a motion profile of the moving point of view. A frame of view is then established onto which an image is projected. The temporal and spatial relationship between the moving point of view and the frame of view is determined at each point along the moving point of view. A plurality of images of the frame of view are obtained from a perspective of a moving point of view while traveling through the motion profile, the plurality of images comprising an array of image points of the frame of view. Each of the plurality of images are then transformed into a plurality of compensated images, the transformation comprising the steps of re-mapping the array of image points of the frame using a transformation function. The transformation function fits each of the plurality of compensated images into the size of the frame of view from a stationary perspective point. The compensated images are projected onto a projection surface from the stationary perspective point in synchronization with the moving profile to substantially reduce point of view image distortion.

Accordingly, it is an object of the present invention to provide a method of compensating for point of view image distortion. Other and further objects and advantages will appear hereafter.

DETAILED DESCRIPTION OF THE PREFERRED EMBODIMENT.

Figure 1:
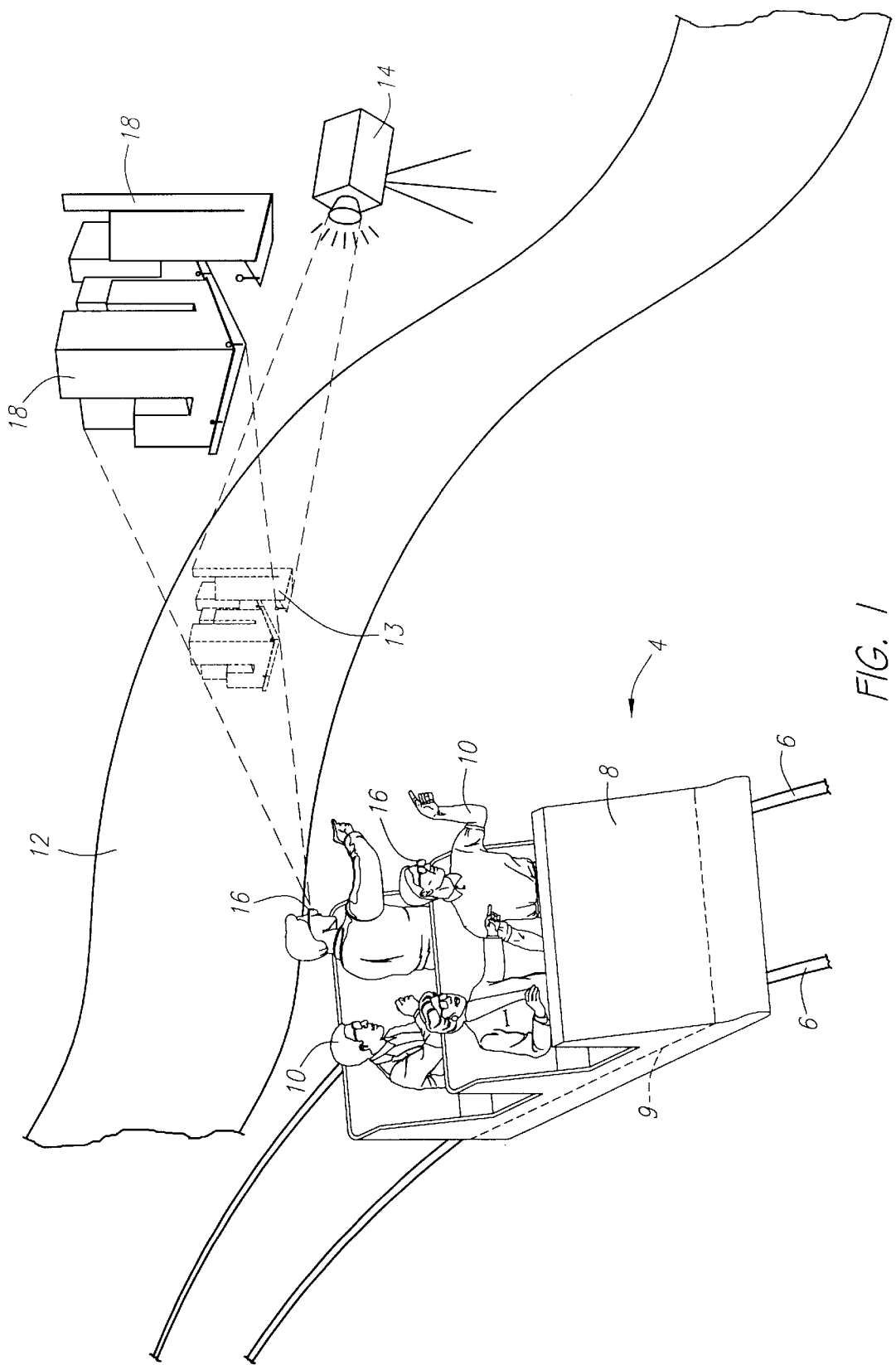
FIG. 1 is a schematic view of an amusement ride incorporating the method of compensating for point of view image distortion for a 3D stereoscopic projection.

Turning now in detail to the drawings, FIG. 1 shows a schematic representation of an amusement ride 4 incorporating the method of compensating for point of view distortion of moving images. As can be seen from FIG. 1, the amusement ride 4 includes a track 6. A vehicle 8 is located on the track 6 and includes seating for passengers 10. The vehicle 8 has wheels or other means for moving along the track 6. During the amusement ride 4 the vehicle 8 containing passengers 10 travels along the track 6 giving the passengers 10 a moving tour of the scenery around them. The track 6 thus defines the motion of the vehicle 8 and the passengers 10 residing therein. In an alternative embodiment, the track 6 is replaced by a controlled path with the vehicles movement controlled via electronic, computer, or other means, rather than by the track. The vehicle 8 may also include a motion base 9, to provide additional degrees of movement.

Figure 11:
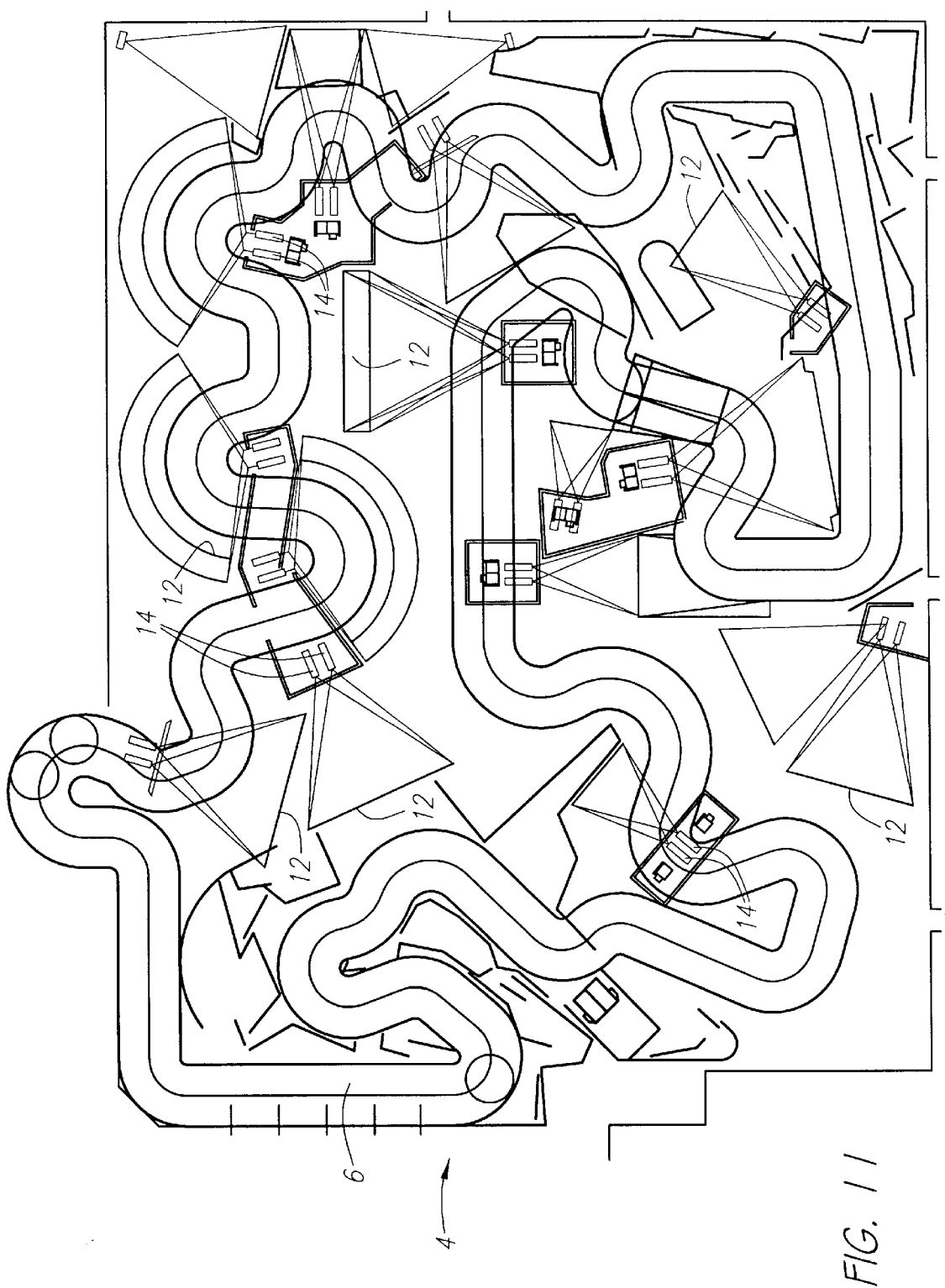
FIG. 11 is a plan view of an amusement ride layout showing the plurality of projection surfaces.

Located outside the vehicle 8 are a plurality of projection surfaces 12. There can be any number of projection surfaces 12 throughout the amusement ride 4. As shown in FIG. 11, preferably, the projection surfaces 12 are screens. The projection surfaces 12 can be any shape, including flat or curved depending on the desired visual effect that will be imparted on the passengers 10.

A projector or a plurality of projectors 14 project images 13 onto the projection surfaces 12. When a plurality of projection surfaces 12 are employed, a separate projector 14 is used for each projection surface 12. In the embodiment shown, the projector 14 is a rear projector 14, wherein the projector 14 is located behind the projecting surface 12, i.e., opposite to where the passengers 10 are located. However, the invention is useful with any projection method, front or rear.

As shown in FIG. 1, the passengers 10 of the vehicle 8 preferably wear 3D stereoscopic glasses 16. The 3D glasses are worn throughout the duration of the ride, and using known 3D projection techniques, give the passengers 10 the impression of a "virtual world" surrounding them. Still referring to FIG. 1, passengers 10 are shown watching the projected images 13 on a single projection surface 12. The illusion created by this amusement ride 4 permits the passengers 10 to see virtual images 18 that appear to project and jut towards them through the projection surface 12.

During the amusement ride 4, when the passengers are traveling in the vehicle 8, the 3D virtual images 18 appear to be a seamless three-dimensional picture of the surrounding scenery. Unlike previous 3D projections, from the passengers 10 perspective, the virtual images 18 do not seem to follow them as they move. Thus, the problem of point of view distortion has been greatly reduced if not eliminated entirely. Rather, the projection surface 12 is a window into a virtual world 18 that greatly enhances the realism of the visual effects.

Figure 2:
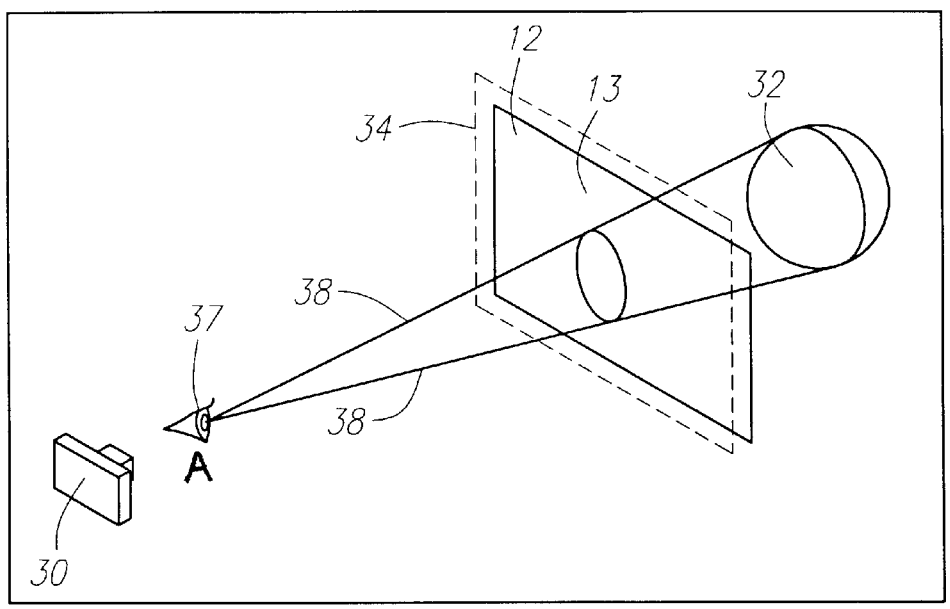
FIG. 2 is a schematic view of an object where there is no image distortion due to point of view image distortion.

With reference now to FIGS. 2 through 6, a description will now be given of the method of compensating for point of view image distortion according to a first embodiment of the invention. In this embodiment of the invention, a method is described that is used for a fixed audience viewing a flat projection surface 12. FIG. 2 shows a simple scene with a camera 30 pointed at a sphere 32 resting on a flat surface (not shown). An imaginary transparent window or frame 34 is then placed between the sphere 32 and the camera 30 and arranged in such a manner that what can be seen through the window 34 fills the entire film frame. A photograph is then taken from point A. The window 34 is then removed and replaced with a projection surface 12, i.e., a screen. The photographic image taken from point A is then projected onto the screen from the same location as the camera 30, with the image 13 completely filing the screen. The projected image 13 is now viewed from the location of point A as shown in FIG. 2. An observer 37 viewing the image at point A would thus see the original scene reproduced on the screen with minimum distortion. In fact, if the projection surface 12 were translucent, an observer 37 would see that the projected image 38 lines up perfectly with the view of the original scene. This is the idealized projection geometry and corresponds with the ideal seat location in a movie theater.

Figure 3:
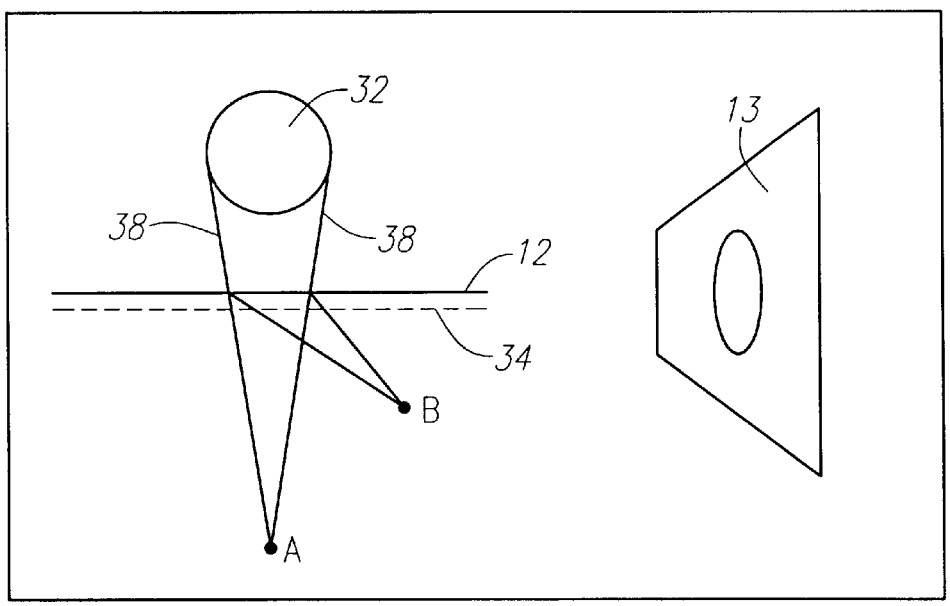
FIG. 3 is a schematic view showing point of view image distortion from point B.
Figure 4:
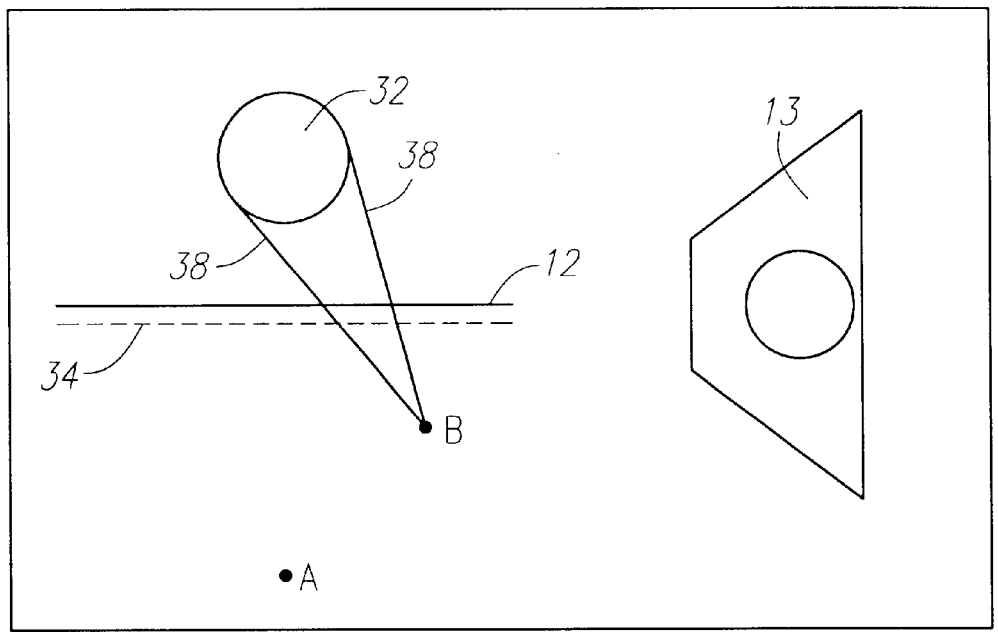
FIG. 4 is a schematic view showing the corrected view of an image from an off-center position at point B.

Now, if the viewing location is moved away from the projection lens, the image 13 begins to appear foreshortened and distorted. This foreshortening is due to point of view distortion that results from moving away from the optimum viewing point A. This effect is shown in the view of the projection surface 12 as seen at position B in FIG. 3. As can be seen in FIGS. 3 and 4, the projection surface 12 has been distorted into the shape of a rhombus, with the nearer portion of the projection surface 12 being longer than the farther portion of the projection surface 12.

At point B, a photograph of the image 13 is taken of the window frame 34 to determine what can be seen through the window 34. What appears from inside the window 34 is what can be seen from point B. To compensate for this foreshortening, the image 13 of FIG. 4 is stretched via computer software such that the corners of the image 13 fill the entire window frame 34 to form a new, compensated image. This compensated image is termed to be a "squinched" image due to the image processing technique that stretches the image. This operation is schematically illustrated in FIG. 5.

Figure 5:
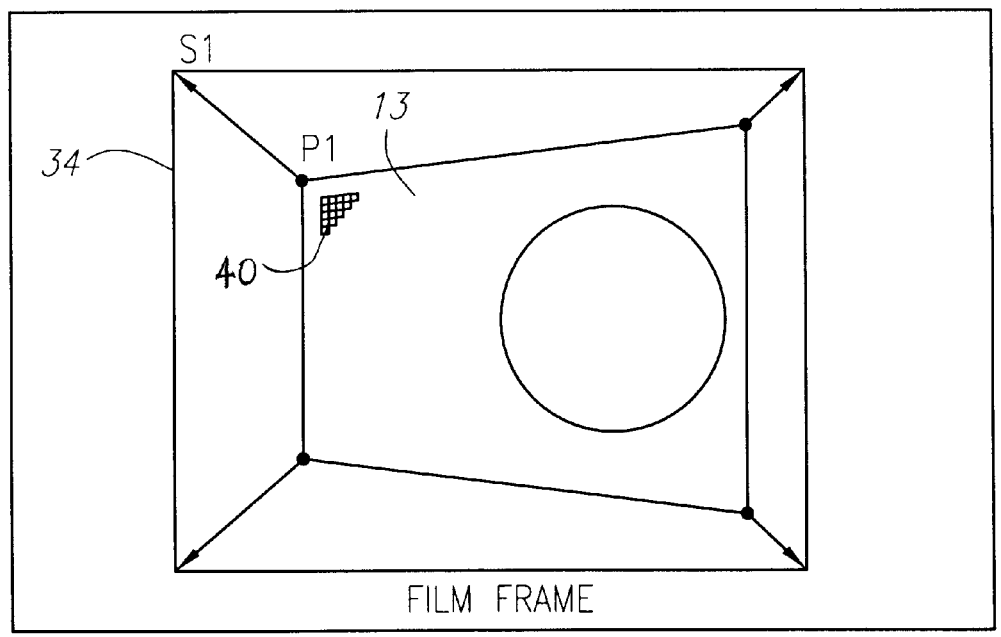
FIG. 5 is a schematic representation of the transformation of the point of view distorted image into a compensated image.

As shown in FIG. 5, the image taken from point B undergoes image processing to stretch the image 13 into the entire window 34 area. This is accomplished by moving the four corners of the image 13 outward to fill the entire window 34. As an example, the point P1 in FIG. 5 is moved outward to the position at S1. The other three corners of the image are moved outward to their respective corners. The image 13 consists of an array of pixels 40 or other image points, e.g., computer generated non-pixel based imagery (collectively referred to as "pixels"). In stretching the image, the image processing program thus stretches and moves the individual pixels or image points 40 of the image toward their respective corners of the window frame 34. Generally, the pixels 40 nearer the center of the image 13 are stretched to a lesser degree than those around the perimeter of the image 13. Thus, the image processing technique works on all of the pixels 40 in the array of the image that is to be "squinched". The image processing technique is implemented with one or more image processing program that is run on a computer.

It should be noted that the "squinching" as referred to herein, refers not only to the expansion of an image to fill a frame, but also a contraction of the image to fit a smaller sized frame. Nonetheless, it is preferable to expand the image to fit the screen so that a border of unused projection surface 12 does not remain.

The image processing program can be any suitable commercially available software. The program utilizes a transformation T such that T(P1)=(S1). The particular transformation is based on the location and orientation of the camera 30, projector 14, projection surface 12, and the observer 37. Consequently, the image re-mapping technique can correct the distortion due to the off-axis viewing.

Figure 6:
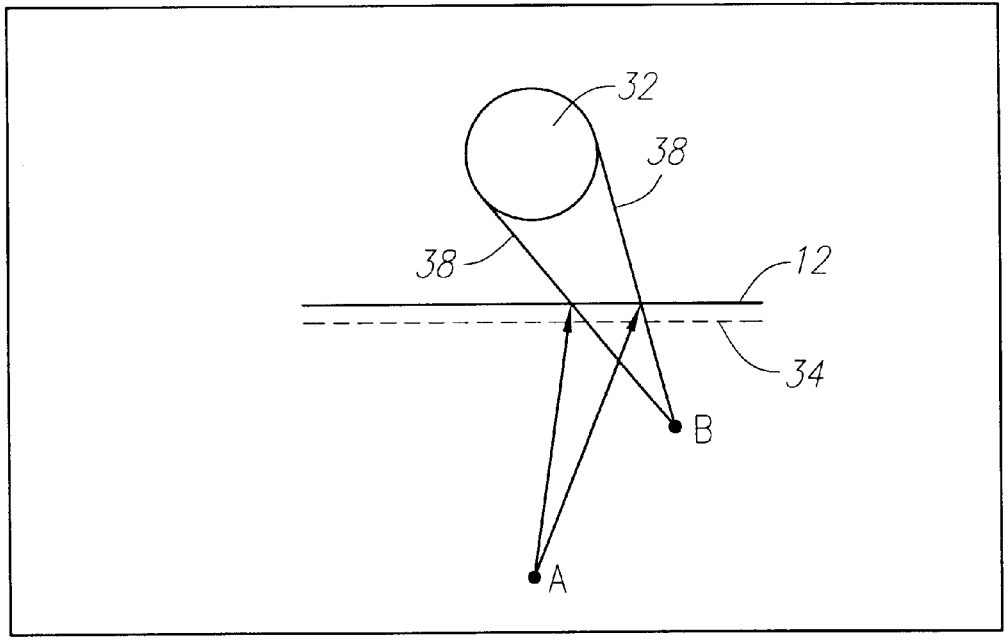
FIG. 6 is a schematic representation showing the compensated image as viewed from an off-center position at point B.

This compensated image is then projected from point A so that again the entire image fills the entirety of the frame 34 (i.e., projection surface 12). If this image is viewed from point B, the distortion due to the foreshortening of the screen has been substantially reduced or eliminated by the squinching of the image 13. The viewer thus sees an accurate reproduction of the original scene as viewed from point B. Referring to FIG. 6, if the projection surface 12 was translucent, the projected image lines 38 would line up with the scene behind it. The effect is that the projection surface 12 has become a window into the scene behind it. For any location in front of the projection surface 12, the image taken from that location can be squinched so as to make it look correct when viewed from that same location but projected from position A. The squinched image will only look correct from the location it was created for, but this location can be anywhere in front of the screen.

Figure 7:
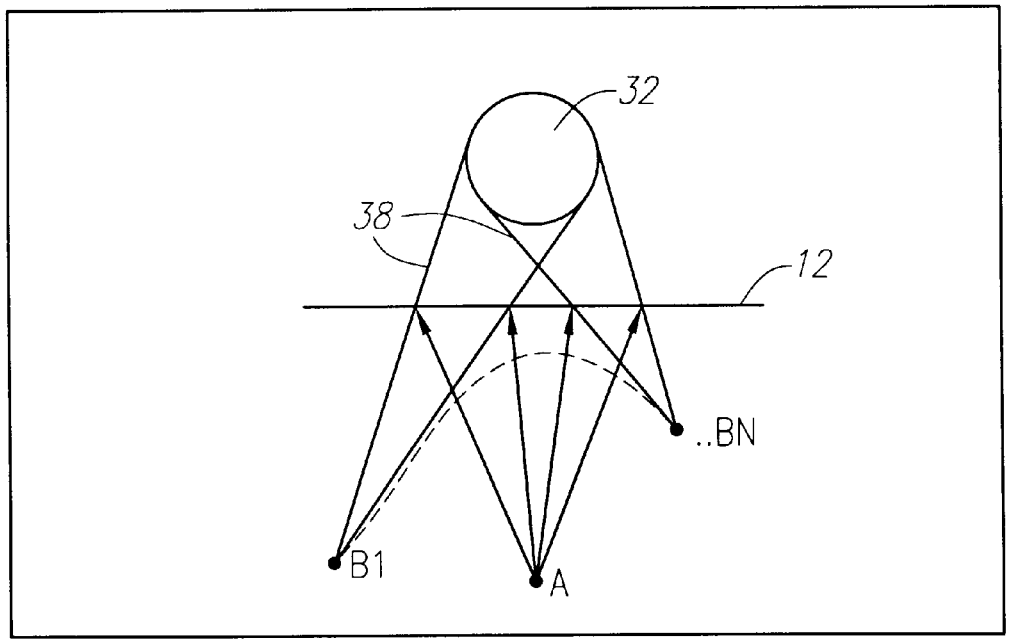
FIG. 7 is a schematic representation showing the projection of compensated images from a stationary perspective point as viewed along a moving motion profile BN-B1 for a flat projection surface.

Now referring to FIG. 7, a description will be given of a separate second embodiment of the present invention. In the second embodiment, a method of compensating for point of view image distortion is provided for a moving point of view. In this embodiment, the point of view is moving across in front of a projection surface 12. The path of this movement is schematically illustrated in FIG. 7 by dashed line BN-B1. This is the situation encountered when passengers 10 of an amusement vehicle 8 travel along a track 6 and view images 13 projected onto projection surfaces 12 throughout the amusement ride 4.

In the moving point of view embodiment, the same image processing technique as the first embodiment is used, however, the process is done on a frame by frame basis. (A frame is a single image that is part of a series of images, that when presented sequentially creates the illusion of motion.) In this method, the motion profile of the passengers 10 is first determined. The geometric orientation of the projection surface 12 is thus determined with respect to the passengers 10 in the vehicle 8. This can be expressed as a geometric relationship that can be computed throughout the course of the amusement ride 4. The motion profile is essentially a recordation of the time, position, speed, and orientation of the amusement ride vehicle 8 as the vehicle moves along the tracks 6 of the ride 4. In this regard, the spatial and temporal orientation of the moving point of view is determined. This is done using well known computer animation tools.

If the vehicle 8 includes a motion base, then, the view point may move in pitch, roll, yaw, heave, surge and sway, as generated by the motion base, in addition to the track generated movements. These movements, if used, are also included in the motion profile.

Next, a frame 34 is determined that will act as the frame 34 of the projected image. Preferably, the frame 34 is the projection surface 12. Typically, this is a projection screen.

In the "virtual environment", invisible markers are placed on the projection surface 12. Preferably, these markers are located at the corners of the frame 34, although alternative locations can be used. The track path is a known path, the screen location is a known location, and the motion profile of the vehicle is a known motion profile. All of this criteria is represented in the computer model and a "virtual camera" is placed in the vehicle model and animated to represent the motion of an actual ride vehicle in the actual environment.

Upon the acquisition of the rendered scene, image processing is performed on the acquired image similar to that described in the first embodiment except that image processing is done for each individual frame. For example, referring now to FIG. 7, the dashed path from BN to B1 illustrates the moving point of view in relation to projection surface 12. At each point along that path, the corresponding image frame is "squinched" to stretch the image to meet the actual dimensions of the frame 34, i.e., the projection surface 12. As with the first embodiment, the image processing technique is implemented with a image processing program using a computer.

The now "squinched" sequence of images are then projected onto the projection surface 12 by a projector 14. The projector projects the images 13 onto the projection surface 12 at the location shown as point A. (See FIG. 7). In FIG. 7, this is shown as being on the same side of the image projection surface 12. Alternatively, a rear projector 14 can be located on the opposite side of the projection surface 12. When projecting this "squinched" version of the images onto the projection surface 12, the vehicle 8 is traveling along the track 6 in the predetermined motion profile. As such, the passenger's 10 movement is synchronized with the projection of the "squinched" images from point A. The resulting projection will compensate for the point of view distortion and appear substantially, if not entirely free of distortion. The projection surface 12 will appear as a window into the original scene even for extreme angles close to the projection surface 12.

Figure 8:
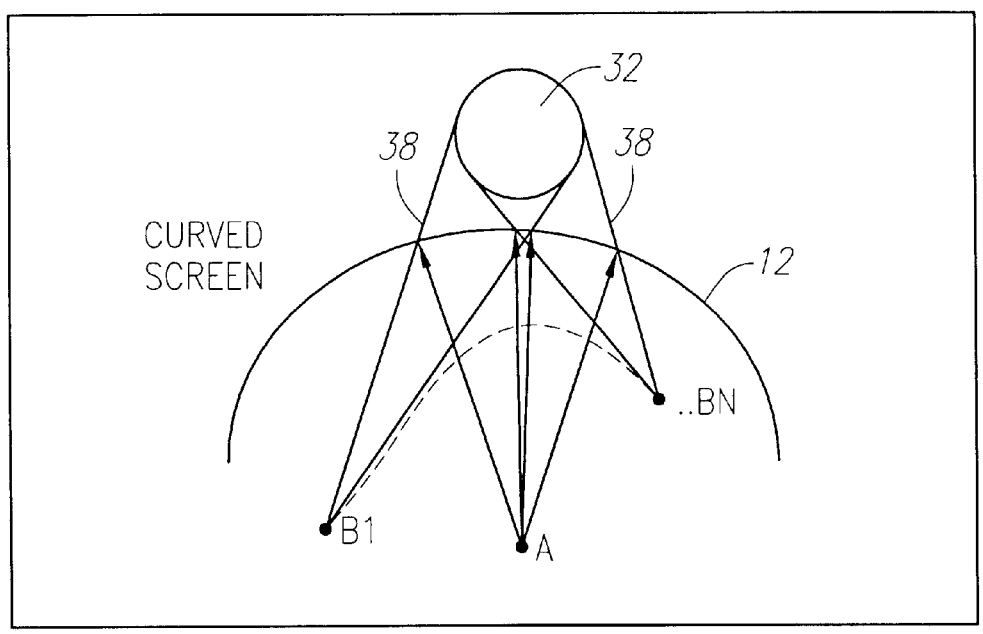
FIG. 8 is a schematic representation showing the projection of compensated images from a stationary perspective point as viewed along a motion profile BN-B1 for a curved projection surface.
Figure 9:
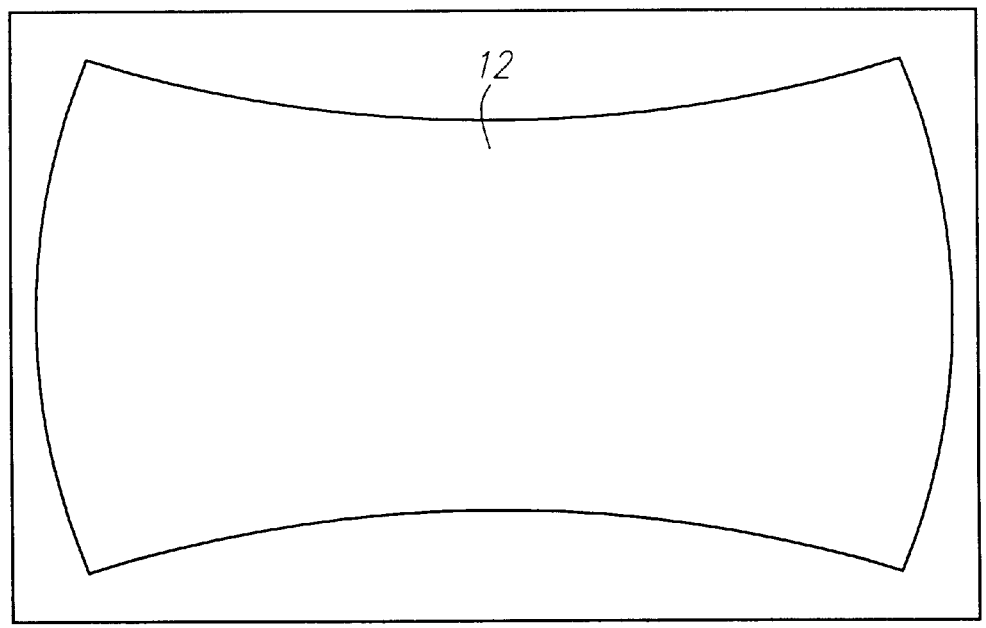
FIG. 9 is a schematic representation of the front perspective of the curved projection surface of FIG. 8.
Figure 10:
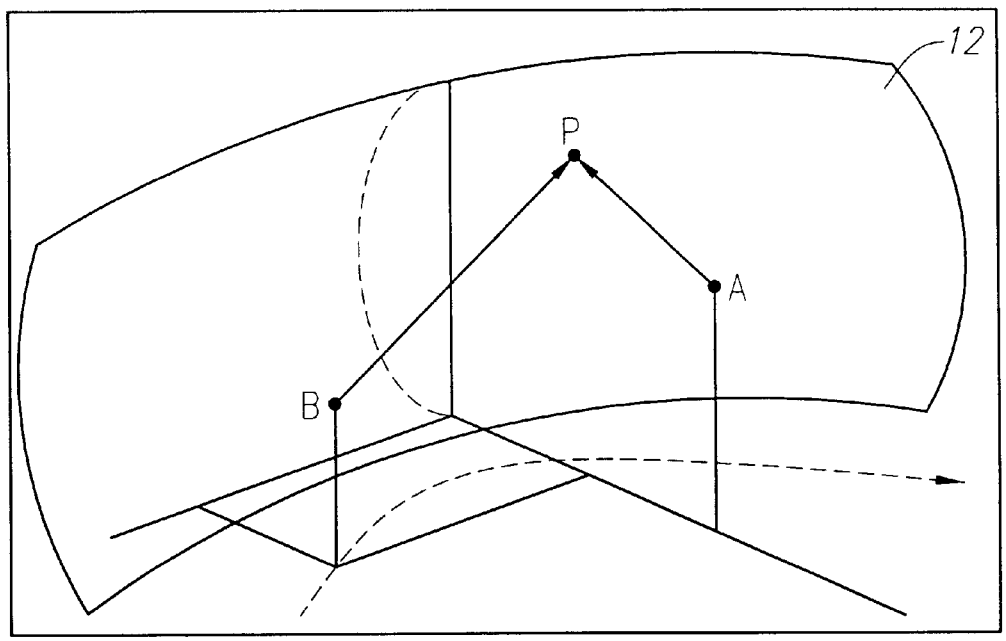
FIG. 10 is a three-dimensional perspective view of a curved projection surface showing the motion profile.

Referring to FIGS. 8 through 10, a description will be now be given of the method for compensating for point of view distortion for use with a curved projection surface 12. The principle of squinching as recited in the previous embodiments is equally applicable to curved projection surfaces 12. In this application, the projector 14 utilizes non-linear lenses along with curved projection surfaces 16. As can be seen from FIG. 8, the curved projection surface 12 continues to be a window onto a scene as viewed anywhere along the path BN-B1. When the properly distorted image is projected from point A onto the projection surface 12, an undistorted view is possible along the entire motion profile.

FIG. 9 shows the image of a toroidal-shaped projection surface 12 as seen from the projector's 14 point of view at point A in FIG. 8. If this image is projected onto the dome screen through a non-linear lens, such as a fisheye lens from point A, the image 13 fills the entire projection surface 12.

The squinching transformation that is used for stretching and moving the pixels 40 of the projected image 13 onto a curved screen is similar to that used in the previously explained embodiments. What is required for squinching on the curved screen is a transformation that will map what is visible from Point B in FIG. 10 onto the film in the right place such that it will appear undistorted when projected from Point A. In the case of the flat screen the image transformation is a simple linear 2D stretch. For the curved screen the transformation is much more complicated. Nonetheless, a mapping transformation T is such that T(P1)= P2 for each point on the projection surface 12. This transform T permits the image taken at point B to be mapped onto each point in the image projected from Point A.

Flat screen and curved screen squinching works for stereoscopic 3D projection as well as monoscopic applications. Two camera locations are used, as in normal stereoscopic cinema The distortion correction is computed independently for left and right eye views and projected using suitable left/right eye separation technology (i.e. polarizing filters). In ordinary stereoscopic projection, the projection distortion works against the 3D illusion. The use of squinching to eliminate distortion causes the parallax based stereo effect to be greatly enhanced.

Thus, an image correction method to compensate for point of view image distortion is disclosed. While embodiments and applications of this invention have been shown and described, it would be apparent to those skilled in the art that many more modifications are possible without departing from the inventive concepts herein. The invention, therefore is not to be restricted except in the spirit of the appended claims and their equivalents.

What is claimed is:

1. A method of compensating for point of view image distortion in 3D stereoscopic image projections for a moving point of view, the method comprising the steps of:
   a. determining a motion profile of the moving point of view;
   b. establishing a frame of view onto which an image is to be projected;
   c. determining the temporal and spatial relationship between the moving point of view and the frame of view at each point along the moving point of view;
   d. obtaining a plurality of images of the frame of view from a perspective of a moving point of view while traveling through the motion profile, the plurality of images comprising an array of image points of the frame of view;
   e. transforming each of the plurality of images into a plurality of compensated images, said transformation comprising the step of re-mapping the array of image points of the frame of view using a transformation function that fits the plurality of compensated images into the size of the frame of view as observed from a stationary perspective point; and
   f. projecting the plurality of compensated images onto a projection surface from the stationary perspective point in synchronization with the moving profile to substantially reduce point of view image distortion.

2. A method according to claim 1, wherein the projection surface is flat.

3. A method according to claim 1, wherein the projection surface is curved.

4. A method of compensating for point of view image distortion in 3D stereoscopic image projections for a moving point of view, the method comprising the steps of:
   a. determining a motion profile of the moving point of view;
   b. establishing a frame of view onto which an image is projected;
   c. determining the temporal and spatial relationship between the moving point of view and the frame of view at each point along the moving point of view;
   d. obtaining a plurality of images of the frame of view while traveling through the motion profile, the plurality of images comprising an array of image points of the frame of view;
   e. transforming each of the plurality of images of the frame of view into a plurality of compensated images, said transformation comprising the step of re-mapping the array of image points of the frame of view using a transformation function, the transformation altering the plurality of images to form a compensated frame substantially equivalent in size to the frame of view; and
   f. projecting a desired sequence of images onto the frame of view using the compensated frame, said projection being in synchronization with the moving profile so as to substantially reduce point of view image distortion from a viewer moving along the moving profile.

5. A method according to claim 4, wherein the projection surface is flat.

6. A method according to claim 4, wherein the projection surface is curved.

7. A method according to claim 4, further comprising the step of printing a film positive of the compensated images and using the film positive to project the compensated images.

8. An amusement ride attraction comprising:
   a vehicle path extending through a building;
   a projection surface adjacent to the path;
   a projector arranged to project a 3D motion picture onto the projection surface;
   a vehicle movable along the vehicle path, the vehicle having passenger positions for accommodating passengers; and
   means for compensating the 3D motion picture to reduce point of view distortion.

9. The amusement ride of claim 7 further comprising 3D generating eyeglasses or lenses associated with the vehicle for use by passengers.

10. The amusement ride of claim 7 wherein the means for compensating comprises a 3D motion picture film positive having images compensated by frame to reduce point of view image distortion, with the images compensated in synchronization with relative movement of the vehicle and the projection surface.

11. A method of compensating for point of view image distortion comprising the steps of:
   a. obtaining an image within a predetermined frame at a first position, the image comprising an array of image points, wherein at the first position the image is distorted due to point of view image distortion;
   b. transforming the distorted image into a compensated image, said transforming comprising the step of re-mapping the array of image points of the distorted image using a transforming function, the function operating on the array of image points to stretch the distorted image to fill the entire frame;
   c. projecting the compensated image at a second position different from the first position, said projection of the compensated image substantially reducing point of view image distortion at the first position, wherein said image is a 3D stereoscopic image.

12. The method of claim 11 wherein the compensated image is projected on a flat projection surface.

13. The method of claim 11 wherein the compensated image is projected on a curved projection surface.

14. A method of compensating for point of view image distortion comprising the steps of:
   a. creating an image within a predetermined frame at a first position, wherein at the first position the image is distorted due to point of view image distortion;
   b. transforming the distorted image into a compensated image using a transforming function to stretch the distorted image to fill the frame;
   c. projecting the compensated image as a 3D stereoscopic image, from a second position different from the first position, wherein the image is a 3D stereoscopic image.

15. A method of compensating for point of view image distortion of a three-dimensional stereoscopic image comprising the steps of:
   a. obtaining a left eye image at a first left eye position, and a right eye image at a first right eye position, within a predetermined frame, and with the left eye image comprising a left array of image points and with the right eye image comprising a right array of image points, wherein at the first left and first right eye positions, the images are distorted due to point of view image distortion;
   b. transforming the distorted left and right eye images into a compensated left and right eye images, said transforming comprising the step of re-mapping the left and right arrays of image points of the distorted left and right eye images using a transforming function, the function operating on the left and right arrays of image points to stretch the distorted left and right eye images to fill the entire frame; and
   c. projecting the compensated left eye image from a second left eye position different from the first left eye position, and projecting the compensated right eye image from a second right eye position different from the first right eye position, to form a compensated three-dimensional stereoscopic image, thereby substantially reducing point of view image distortion.

16. A method of compensating for point of view image distortion comprising the steps of:
   projecting an image onto a projection surface at a first position;
   placing a plurality of invisible markers on the projection surface;
   acquiring an image of the projection surface at a second position, the image comprising an array of pixels, wherein at the second position the image is distorted due to point of view image distortion;
   transforming the distorted image into a compensated image, the transforming comprising the step of re-mapping the array of pixels of the distorted image using a transformation function, the function operating on the array of pixels to stretch the distorted image using the location of the plurality of invisible makers;
   projecting the compensated image at the first position, the projection of the compensated image substantially reducing point of view image distortion at the second position; and
   wherein the image is a 3D stereoscopic image.

17. The method of claim 16, wherein the plurality of invisible markers are placed at the corners of the projection surface.

18. The method of claim 16, wherein the projection surface is flat.

19. The method of claim 16, wherein the projection surface is curved.

20. The method of claim 16, wherein the method is employed for a moving point of view.

21. A method of compensating for point of view image distortion comprising the steps of:
   a. obtaining an image at a first position, the image comprising an array of image points, wherein at the first position the image is distorted due to point of view image distortion;
   b. transforming the distorted image into a compensated image, said transforming comprising the step of re-mapping the array of image points of the distorted image using a transforming function, the function operating on the array of image points to compensate the distorted image;
   c. projecting the compensated image at a second position different from the first position, said projection of the compensated image substantially reducing point of view image distortion at the first position, wherein said image is a 3D stereoscopic image.

22. The method of claim 21 wherein the compensation comprises expanding the array of image points to fill an entire frame.

23. The method of claim 21 wherein compensation comprises contracting the array of image points to fit within a portion of the frame.

* * * * *

UNITED STATES PATENT AND TRADEMARK OFFICE
CERTIFICATE OF CORRECTION

PATENT NO. : 6,462,769 B1
DATED : October 8, 2002
INVENTOR(S) : Scott Trowbridge and Thierry Coup It is certified that error appears in the above-identified patent and that said Letters Patent is hereby corrected as shown below:

Column 8,
Lines 59 and 62, change "7" to -- 8 --.

Signed and Sealed this

Seventh Day of February, 2006

JON W. DUDAS
*Director of the United States Patent and Trademark Office*